United States Patent
Zelenka (10) Patent No.: US 10,424,207 B2
(45) Date of Patent: *Sep. 24, 2019

(54) AIRBORNE DRONE TRAFFIC BROADCASTING AND ALERTING SYSTEM

(71) Applicant: Drone Traffic, LLC, Denver, CO (US)

(72) Inventor: Richard Eric Zelenka, Denver, CO (US)

(73) Assignee: Drone Traffic, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,986

(22) Filed: Sep. 22, 2018

(65) Prior Publication Data

US 2019/0019417 A1 Jan. 17, 2019

Related U.S. Application Data

(63) Continuation of application No. 15/333,126, filed on Oct. 24, 2016, now Pat. No. 10,083,614.

(51) Int. Cl.
*G08G 5/00* (2006.01)
*G08G 5/04* (2006.01)
(Continued)

(52) U.S. Cl.
CPC ......... *G08G 5/0013* (2013.01); *B64C 39/024* (2013.01); *B64D 45/00* (2013.01); *B64D 47/08* (2013.01); *G08G 5/00* (2013.01); *G08G 5/003* (2013.01); *G08G 5/0008* (2013.01); *G08G 5/0021* (2013.01); *G08G 5/0026* (2013.01); *G08G 5/0069* (2013.01); *G08G 5/0078* (2013.01); *G08G 5/04* (2013.01)

(58) Field of Classification Search
CPC ...... G08G 5/0013; G08G 5/00; G08G 5/0008; G08G 5/0021; G08G 5/0026; G08G 5/003; G08G 5/0069; G08G 5/0078; G08G 5/04; B64C 39/024; B64D 45/00; B64D 47/08
USPC .......................................................... 340/961
See application file for complete search history.

(56) References Cited

U.S. PATENT DOCUMENTS 5,581,250 A 12/1996 Khvilivitzky
6,082,675 A 7/2000 Woodall
(Continued)

FOREIGN PATENT DOCUMENTS

WO WO 2014/115139 7/2014

*Primary Examiner* — Kerri L McNally
(74) *Attorney, Agent, or Firm* — Critical Path IP Law, LLC (57) ABSTRACT

A system and method to alert pilots of the presence of drone aircraft and to document or report errant drone flight operations, in particular to alert and report drone aircraft which may present a hazard to a piloted aircraft and/or are operating outside governing regulations. In one embodiment, the system comprises a surveillance subsystem configured to identify a drone operating in an airspace adjacent the aircraft; an imaging subsystem configured to acquire at least one image of the drone; a triggering subsystem interconnected with the surveillance subsystem and configured to activate the imaging subsystem; a navigational subsystem configured to provide aircraft state data associated with the at least one image; and a communication subsystem configured to transmit the at least one image and the associated aircraft state data to a receiving station; wherein the at least one image and the associated aircraft state data are transmitted to the receiving station.

20 Claims, 5 Drawing Sheets

(51) Int. Cl.
*B64D 45/00* (2006.01)
*B64D 47/08* (2006.01)
*B64C 39/02* (2006.01)

(56) References Cited

U.S. PATENT DOCUMENTS

| | | | |
|---|---|---|---|
| 7,127,334 B2 * | 10/2006 | Frink | B64D 45/0015 |
| | | | 701/3 |
| 8,643,719 B2 | 2/2014 | Vian | |
| 8,838,289 B2 | 9/2014 | Margolln | |
| 8,970,401 B2 * | 3/2015 | Molander | G01S 11/12 |
| | | | 340/961 |
| 9,077,731 B2 | 7/2015 | Yusupov | |
| 9,087,451 B1 | 7/2015 | Jarrell | |
| 9,117,318 B2 | 8/2015 | Ricci | |
| 9,129,520 B2 * | 9/2015 | Limbaugh | G08G 5/0013 |
| 9,311,760 B2 | 4/2016 | Downey | |
| 9,318,014 B1 | 4/2016 | Cheatham | |
| 9,805,273 B1 | 10/2017 | Seeber | |
| 10,025,993 B2 | 7/2018 | Seeber | |
| 2010/0085236 A1 * | 4/2010 | Franceschini | G01S 13/765 |
| | | | 342/30 |
| 2012/0143482 A1 | 6/2012 | Goossen | |
| 2012/0215382 A1 | 8/2012 | Lee | |
| 2013/0036727 A1 | 2/2013 | Helchel | |
| 2014/0018979 A1 | 1/2014 | Goossen | |
| 2014/0143482 A1 | 5/2014 | Meir et al. | |
| 2015/0260824 A1 | 9/2015 | Malveaux | |
| 2015/0302858 A1 * | 10/2015 | Hearing | G10L 19/00 |
| | | | 381/58 |
| 2016/0176538 A1 * | 6/2016 | Bekanich | B64D 45/00 |
| | | | 701/14 |

* cited by examiner

| | Drone No. | Drone Flt Plan | Time of Use |
|---|---|---|---|
| 556A → | Smoke 198 | Area 4 | 1400-1430Z |
| 556B → | Lulu23 | Area 3D | 1300-1400Z |
| 556C → | Lucy54 | Area 4 | 1300-1400Z |
| 556D → | DPA18 | Area 4 | 1600-1700Z |
| 556E → | APA49 | Area 43 | 1600-1700Z |

254A, 254B, 254C point to column headers.

| DATE | Reporting Aircraft Position | Reporting Aircraft Altitude | Reporting aircraft activity | Estimated Drone Location | Camera Data | Flight Map | Other |
|---|---|---|---|---|---|---|---|
| 9-21-16 | 39-34-12.4602N / 104-50-57.5000W | 6884 MSL | Take-off from 35R | 39-34-12.47N / 104-50-58W | Yes, Visible band | Yes | Repeat occurrence |

258A–258H point to column headers; 259 points to the data row.

AIRBORNE DRONE TRAFFIC BROADCASTING AND ALERTING SYSTEM

CROSS-REFERENCE TO RELATED APPLICATION

This application is a continuation of U.S. patent application Ser. No. 15/333,126 filed Oct. 24, 2016 and titled "Drone Alerting and Reporting System," which in turn claims the benefit of priority to U.S. Provisional Patent Application No. 62/245,137 filed Oct. 22, 2015 entitled "Drone Alerting and Reporting System," the contents of both of which are incorporated by reference in their entirety.

OBJECTIVE

An objective of the disclosed invention is to reduce the hazards posed by drones aka RPVs, UAVs, UMVs to pilots, in particular to general aviation (G/A) and business aviation pilots.

BACKGROUND

Drone operations have greatly expanded, both in volume and in character. Drones have moved from hobbyist use few in frequency to regular use in business activities such as pipeline inspection. More wide-spread use of drones is inevitable, benefiting many businesses and operators.

Drone operators vary in skill and responsibility. Most drone operators strive for safe operation of their drones, adhering to regulatory terms and conditions. Aviation regulations governing drone operations have struggled to keep up with increased use. Furthermore, not every drone operator is aware of required regulations and those that are occasionally err in adhering to those regulations. On some occasions, drones have intruded into regulated airspace or interfered with piloted aircraft operations. The proliferation of unmanned aircraft raises concerns of airborne collisions with manned aircraft.

Toward increasing safety and enforcing evolving regulatory rules governing drone operations, an alerting and reporting system is needed to identify and document errant and unsafe drones and drone operators. This disclosure addresses those needs.

SUMMARY

A system and method is disclosed to alert airborne pilots of the presence of drone aircraft and to document or report errant drone flight operations, in particular to alert and report drone aircraft which are of hazard to an airborne pilot's aircraft and/or not operating within regulations.

In one embodiment, an airborne system to identify and report drone flight operations is disclosed, the system disposed on an aircraft and comprising: a surveillance subsystem configured to identify a drone operating in an airspace adjacent the aircraft; an imaging subsystem configured to acquire at least one image of the drone; a triggering subsystem interconnected with the surveillance subsystem and configured to activate the imaging subsystem; a navigational subsystem configured to provide aircraft state data associated with the at least one image; and a communication subsystem configured to transmit the at least one image and the associated aircraft state data to a receiving station; wherein the at least one image and the associated aircraft state data are transmitted to the receiving station.

In another embodiment, a drone reporting system for use during airborne flight operations is disclosed, the system disposed on an aircraft and comprising: a surveillance module configured to scan and identify a drone operating in an airspace adjacent the aircraft; an imaging module comprising a camera configured to acquire at least one image of the drone; a triggering subsystem interconnected with the surveillance module and configured to activate the imaging module; a navigation module configured to provide aircraft state data associated with the at least one image; and a communication module configured to transmit the at least one image and the associated aircraft state data to a receiving station; wherein a drone operating in an airspace adjacent the aircraft is identified, at least one image of the drone is acquired and transmitted to the receiving station, the at least one image transmitted with the associated aircraft state data.

In yet another embodiment, a method of locating and reporting an airborne drone from an airborne aircraft is disclosed, the method comprising: providing a system disposed on the airborne aircraft, the system comprising a surveillance subsystem, an imaging subsystem, a navigational subsystem and a communication subsystem; identifying, by the surveillance subsystem, an airborne drone operating in an airspace adjacent the airborne aircraft; imaging, by the imaging subsystem, the airborne drone wherein at least one image of the airborne drone is acquired; obtaining, by the navigational subsystem, an aircraft state data associated with the at least one image; broadcasting, by the communication subsystem, the at least one image and the associated aircraft state data to a receiving station.

In another embodiment, a non-transitory computer readable medium having instructions stored thereon that, when executed by a processor, perform a method is disclosed, the method comprising: providing a system disposed on the airborne aircraft, the system comprising a surveillance subsystem, an imaging subsystem, a navigational subsystem and a communication subsystem; identifying, by the surveillance subsystem, an airborne drone operating in an airspace adjacent the airborne aircraft; imaging, by the imaging subsystem, the airborne drone wherein at least one image of the airborne drone is acquired; obtaining, by the navigational subsystem, an aircraft state data associated with the at least one image; broadcasting, by the communication subsystem, the at least one image and the associated aircraft state data to a receiving station.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A communication channel is used to convey an information signal, for example a digital bit stream, from one or several senders (or transmitters) to one or several receivers. A communication channel has a certain capacity for transmitting information, often measured by its bandwidth in Hz or its data rate in bits per second. Communication channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, Eb/No, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "display" refers to a portion of a screen used to display the output of a computer to a user.

The terms "determine", "calculate" and "compute," and variations thereof, as used herein, are used interchangeably and include any type of methodology, process, mathematical operation or technique.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "module" as used herein refers to any known or later developed hardware, software, firmware, artificial intelligence, fuzzy logic, or combination of hardware and software that is capable of performing the functionality associated with that element.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

The term "satellite positioning system receiver" can refer to a wireless receiver or transceiver to receive and/or send location signals from and/or to a satellite positioning system (SPS), such as the Global Positioning System ("GPS") (US), GLONASS (Russia), Galileo positioning system (EU), Compass navigation system (China), and Regional Navigational Satellite System (India).

By way of providing additional background and context for the invention, and to further satisfy the requirements of 25 USC Section 112, the following references are incorporated by reference in entirety for all purposes: WIPO Pat. Appl. Nos. 2014/115139 entitled "System and Methods for Automated Airport Air Traffic Control Services;" and 2013/036727 entitled "Device and Method for 3d Sampling with Avian Radar;" U.S. Pat. No. 6,082,675, entitled "Standoff Delivered Sonobuoy;" U.S. Pat. No. 8,838,289 entitled "System and method for safely flying unmanned aerial vehicles in civilian airspace;" U.S. Pat. No. 8,643,719 entitled "Traffic and security monitoring system and method;" U.S. Pat. No. 9,087,451 entitled "Unmanned aerial vehicle communication, monitoring, and traffic management;" U.S. Pat. No. 7,127,334 entitled "System and methods for preventing the unauthorized use of aircraft;" U.S. Pat. No. 5,581,250 entitled "Visual collision avoidance system for unmanned aerial vehicles U.S. Pat. No. 9,077,731 entitled "Extended Graphics Context with Common Composting;" U.S. Pat. No. 9,117,318 entitled "Vehicle diagnostic detection through vehicle sensitive skin;" U.S. Pat. Appl. Nos. 2012/0215382 entitled "System and Method for Controlling Unmanned Aerial Vehicle in Flight Space; 2014/0018979 entitled "Autonomous Airspace Flight Planning and Virtual Airspace Containment System;" 2014/0018976 entitled "System and Method for Unmanned System Data Collection, Management, and Reporting;" and 2012/0143482 entitled "Electronically File and Fly Unmanned Aerial Vehicle."

Embodiments include a non-transitory computer readable medium having instructions stored thereon that, when executed by a processor, perform operations comprising the above methods. Embodiments include a device, means, and/or system configured to perform the above methods.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

With reference to FIGS. 1-5, a system and method for drone alerting and reporting is disclosed. Generally, the system 100 is disposed on a host aircraft 200, such as a general aviation aircraft, and surveils adjacent airspace while the host aircraft 200 is airborne. Observed drone aircraft 300, in some cases drone aircraft posing a threat to the host aircraft 200 or otherwise operating in an unsafe or wrongful manner, are identified and recorded or documented. The recording, which may comprise an image, is then communicated to an entity, such as a governmental regulatory entity, that is interested in safe and proper drone flight operations.

Figure 1:
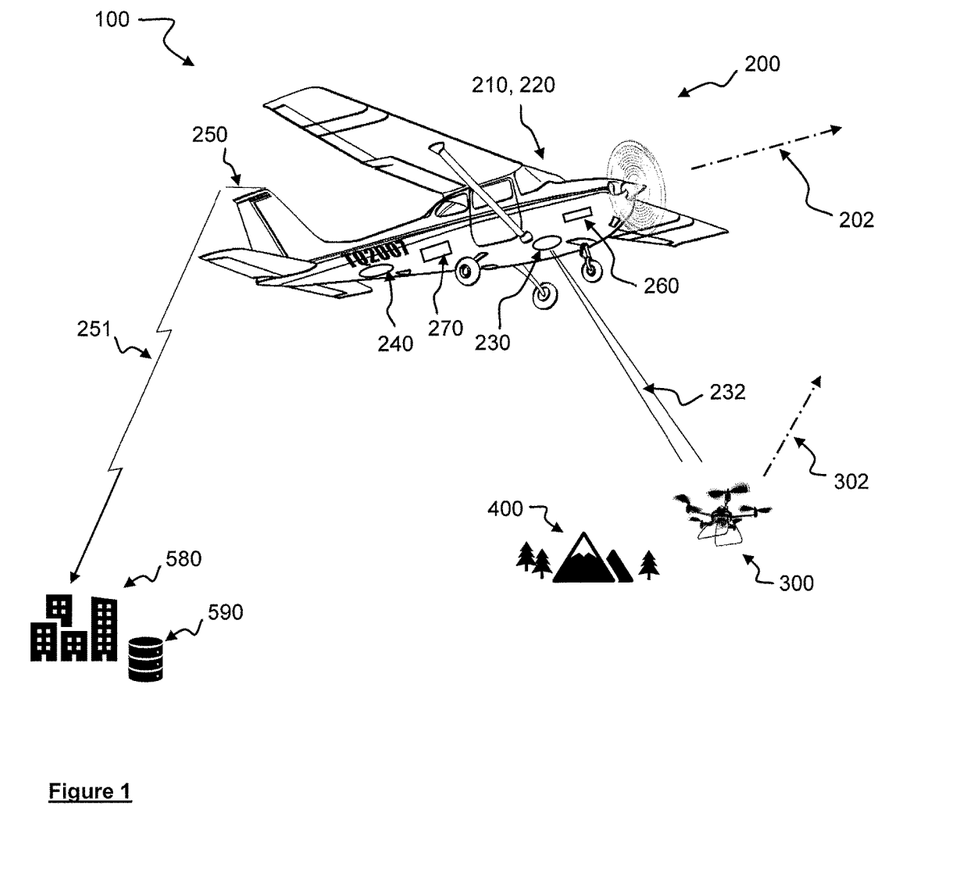
FIG. 1 is a conceptual drawing of the drone alerting and reporting system according to one embodiment.

FIG. 1 depicts the drone alerting and reporting system 100 comprising host aircraft 200, target drone 300, earth datum 400 and concerned airspace management entity 580 with database 590. The host aircraft 200 follows flight path vector 202 and is piloted by pilot 210 who operates a system input/output device 220 which may allow selectable operational control and management of system 100. The input/output device 220 may comprise a display. Airborne components disposed on aircraft 200 (which in one embodiment, one or more are detachable) comprise surveillance subsystem 230 comprising sensor with principal look vector 232, aircraft database 240, aircraft communication subsystem 250 broadcasting or transmitting data stream 251, aircraft navigation subsystem 260, and aircraft data management subsystem 270.

Figure 2A:
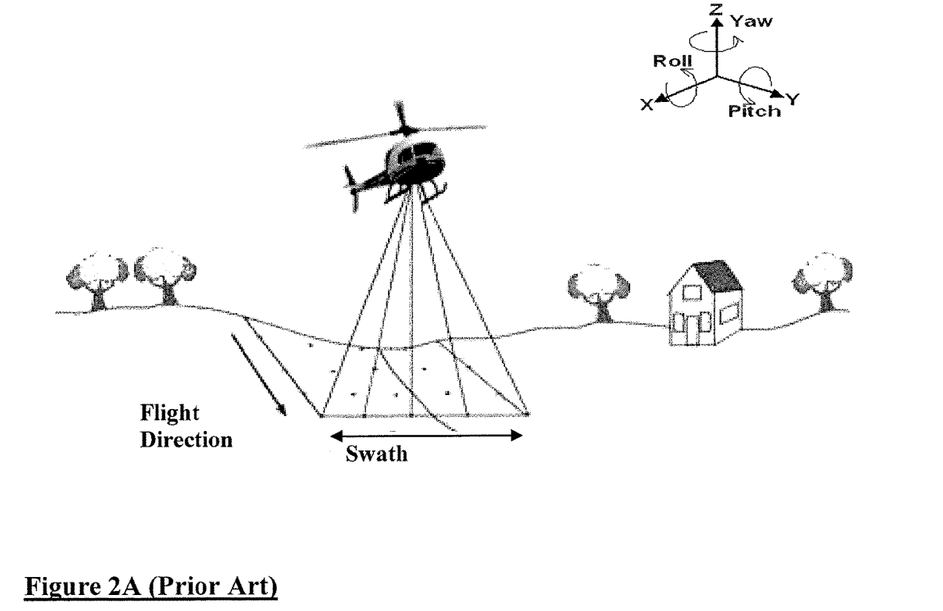
FIG. 2A is a conceptual diagram of aircraft and sensor orientation according to the prior art.

Aircraft surveillance subsystem 230 comprises one or more sensors directed at target drone 300 along sensor prime look vector 232. Sensor may comprise any sensors known to those skilled in the art to include cameras in any frequency to include visible and IR bands, and radars in known bands to include MMW bands. Sensors may capture still images and/or multiple images as video images, and may be captured with associated aircraft navigational data system 260 data such as aircraft position, time stamp e.g. in UTC time, INU data of aircraft and/or sensor. Navigational data may comprise satellite positional data. Such sensor image data of drone 300 may be manipulated, massaged and/or synchronized, with the host aircraft state data, via a data management system 270 and may include earth reference datum information such as local geographic features. The term "camera" comprises a single shot "still" camera and video camera, with the ability to photograph an area surrounding the host aircraft, comprising below, above and adjacent the host aircraft flight path. The captured drone data may also be associated with aircraft moving mapping software or data such as that provided by available commercial products, to include ForeFlight™ software. Sensor capturing of airborne targets and associated such data with navigational data (eg airborne host aircraft data) or with ground based features is known in the art, as shown in FIG. 2A.

The data management system 270 may also arrange the captured imagery data of drone so as to conform to concerned airspace management entity 580 reporting requirements. For example, concerned airspace management entity 580 FAA may request or require that reports of errant aircraft, such as errant drones, be provided in a specified format; as such, in one embodiment the data management system 270 prepares the captured errant drone data in such a format prior to broadcasting or communicating such data to the FAA.

In some embodiments, the surveillance subsystem 230 and/or the recording system is triggered by a trigger event, such as side track distance to an intended drone flight path or the observation of a drone. In some embodiments, on the occurrence of a trigger event, recording begins and/or alternate sensor system types or sensor parameters are established. In some embodiments, upon a trigger event, one or more cameras may enter an operating mode wherein continuous filming is taken (e.g. video or a rapid sequence of still shots).

The surveillance system, e.g. a visible band camera, may operate in any of several modes comprising periodic recording (e.g. every 1 sec), upon on/off activation (i.e. a single photo) per users comprising pilot, crew member and passenger activation, based on routing (e.g. between legs of host aircraft flight plan or a particular known drone flight plan), or as triggered by an event. Trigger event may be an identified drone operation, as predicted by a comparison of host aircraft flight path or plan and a particular drone flight plan or path, or as alerted by another pilot or a ground-based entity (e.g. FAA controller, plane spotter, drone spotter, etc).

A trigger event may result in an alert comprising an alert to the pilot, crew member, and passenger and/or a broadcast of a recording associated with the trigger event. In some embodiments, the surveillance system may be operated manually by a user comprising pilot, crew members and/or passengers. Surveillance system sensors e.g. camera may be mounted on the belly of aircraft, aircraft empennage or other mounting location known to those skilled in the art.

In one embodiment, the system 100 operates without pilot input. That is, the system 100 operates autonomously without human input. More specifically, once the host aircraft is airborne, the system automatically scans or surveils adjacent airspace to aircraft 200 along one or both sides of aircraft flight path vector 202, records earth datum data and host aircraft state data and sensor state or orientation data, performs any data formatting adjustments, and then broadcasts or transmits the data to an entity concerned or interested in drone activity.

Figure 2B:
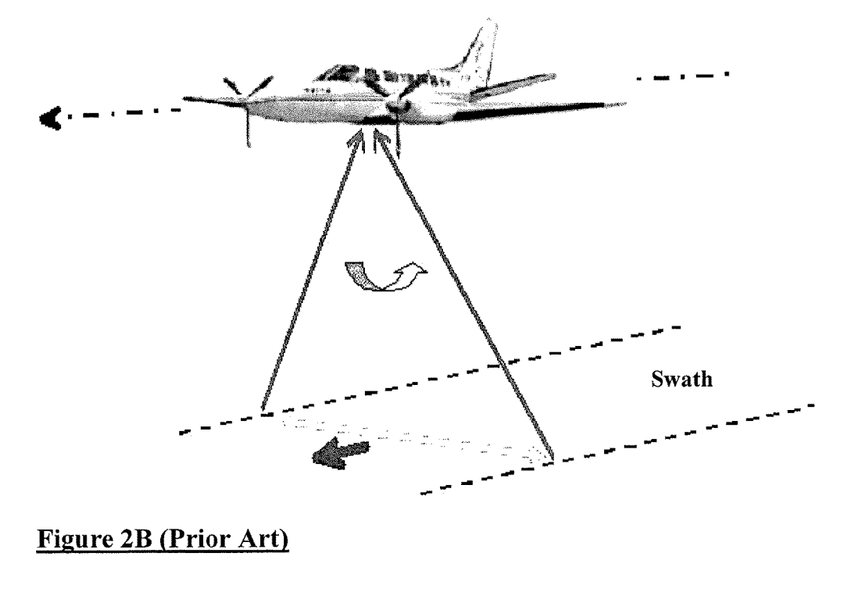
FIG. 2B is a conceptual diagram of surveillance sensor geometries according to the prior art.

Sensor scanning or surveillance may be along both sides of aircraft 200 forming a swath angle as shown in FIG. 2B. Swatch dimension is defined as along the flight path of the aircraft and of substantially equal lateral distance to either side of aircraft, as shown in FIG. 2B. In one embodiment, swath distance is no more than 1 nautical mile (i.e. plus/minus 0.5 nautical mile each side of aircraft flight path). In another embodiment, swath distance is no more than 2 nautical miles. In another embodiment, swath distance is no more than 6 nautical miles. In another embodiment, swath distance is no more than 10 nautical miles. As swath distance is a function of aircraft altitude, the above swath distance may result in the sensor adjusting its scan angle to satisfy a given swath width. For example, an aircraft at 1,500 ft MSL requires a scan at 76 degree to cover a swath of 2 nautical miles (as arctan(6076/1500)=76 degree). In some embodiments, scan angle (on each side) is less than 80 degrees. In another embodiment, scan angle is less than 65 degree. In another embodiment, scan angle is less than 45 degrees.

Figure 3A:
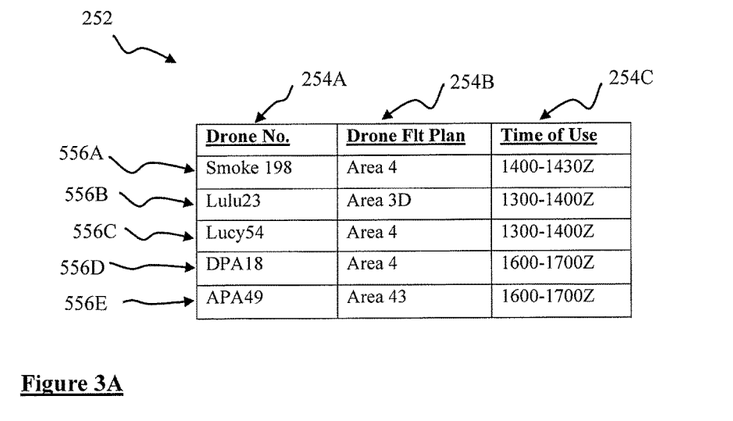
FIG. 3A is one embodiment of a data structure of input data to the system of FIG. 1.

Data may be uploaded to host aircraft 200 to assist in system 100 operations, such as operation of surveillance system 230 and/or data management system 270. For example, data may be uploaded or received by aircraft database 240 to direct the one or more sensors of surveillance subsystem 230. (For example, a sensor may be guided or "trained" to track an intended or filed flight plan of a particular drone.) An exemplar data structure of input data 252 to aircraft database is depicted in FIG. 3A. Other data structures and data are possible. In FIG. 3A, a drone identifier number is provided as data element 254A. Such a registration number may be provided by a regulatory entity such as the FAA. Element 254B provides a flight plan for a particular drone, e.g. an area of operation such as "area 4." Other flight plans may provide more traditional waypoints and full VFR or IFR piloted-like flight plans e.g. KAPA to KBDU to KAPA, perhaps with time of departure, time enroute, etc. Data element 254C provides time of use, that is, the time of operation for the drone. Other data items may provide type of drone, regulatory limits of a drone (e.g. flight only line of sight to operator, flight below 400 feet, etc). Rows 256A-236E provide examples of complete exemplar data records for four drones. Aircraft may be configured to receive airborne updates of drone operations to include new or modified drone flight plans.

Figure 3B:
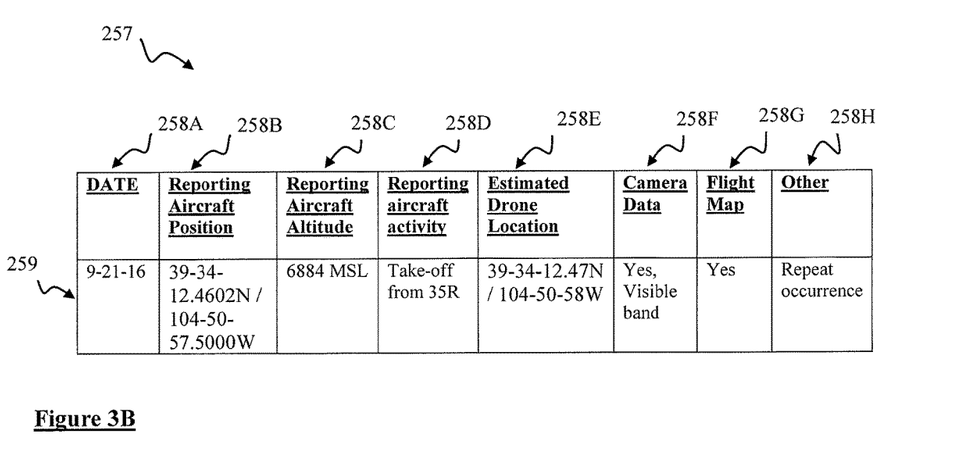
FIG. 3B is one embodiment of a data structure of output data from the system of FIG. 1.
Figure 4A:
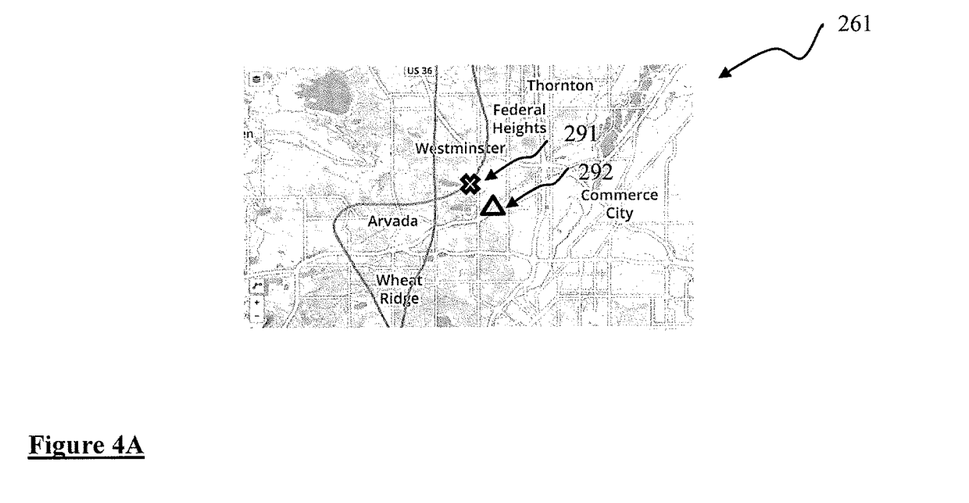
FIG. 4A is one embodiment of flight map data reported by the system of FIG. 1.
Figure 4B:
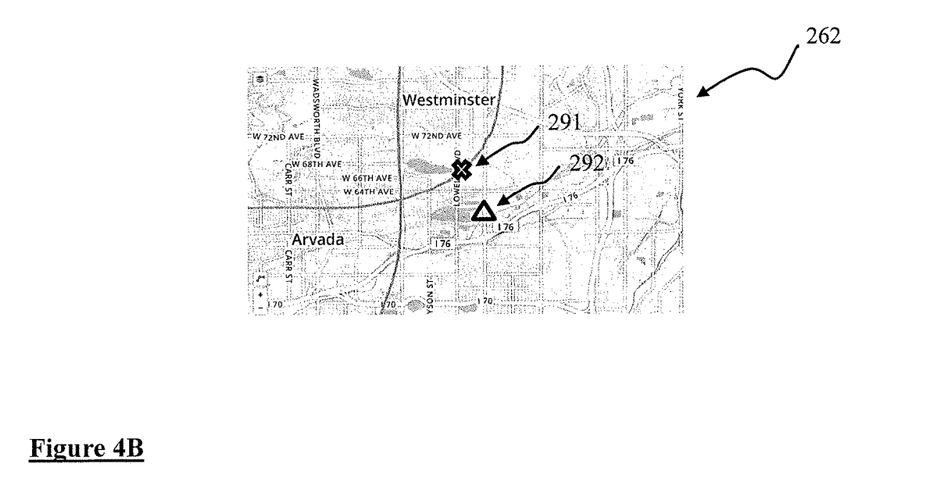
FIG. 4B is another embodiment of flight map data reported by the system of FIG. 1.

Data output or broadcast or communicated by the host aircraft 200 to concerned airspace management entity 580 may be as provided by exemplary data structure 257. The data structure 257 provides data as associated with an identification, recording and/or alerting by aircraft 200 of drone 300. A typical flight record 259 is now described. Element 258A provides a calendar date, while element 258B an aircraft position, e.g. in latitude-longitude and element 258C an aircraft altitude. The elements 258B and 258C may readily be provided by an onboard navigational system. Element 258D may be pilot entered or derived from aircraft attitude and conditions, eg take-off may be determined based on position on runway, acceleration to take-off speed and pitch up attitude. The estimated drone location 258E may be determined or estimated from mathematical computations of sensor orientation, relative to the aircraft, with addition of range to drone data (eg from a radar return) or perhaps through comparison of multiple images so as to triangulate from a sequence of images. Element 258F provides type of camera data, e.g. visible band, IR, etc. Flight map 258G indicates if flight map data are also available, as depicted in FIGS. 4A-B. Element 258H may be a pilot entered data item, e.g. as shown a pilot entered note that the particular drone identification is a repeat occurrence.

FIGS. 4A-B provide an exemplar flight map, respectively map 261 and 262, where map 262 is a close-up of map 261. In each map, the aircraft location is identified as element 291 and drone as element 292.

Figure 5:
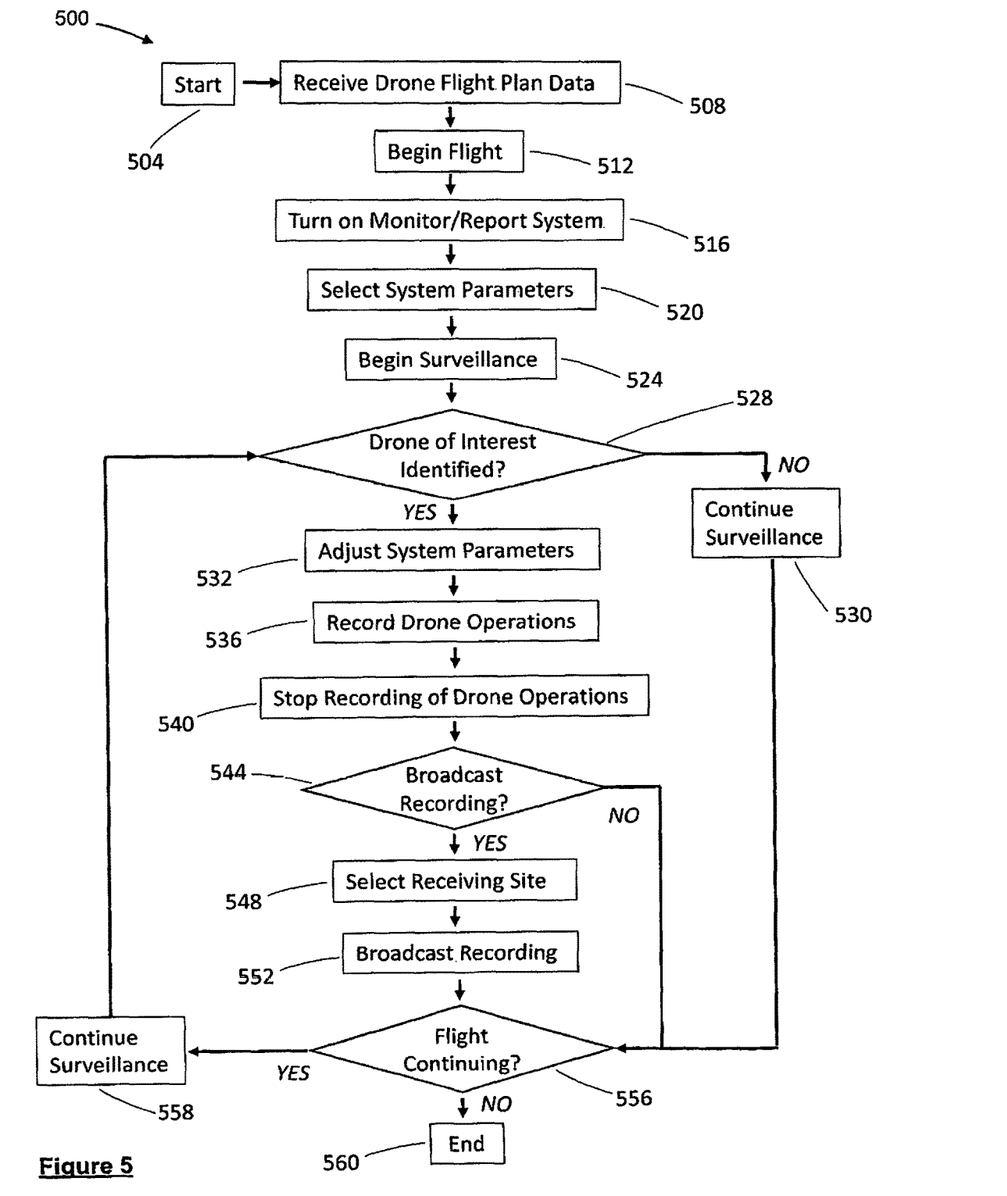
FIG. 5 is a flow-chart of one embodiment of a method of use of the system of FIG. 1.

FIG. 5 is a flowchart of a general order of one method 500 of use of the drone alerting and reporting system 100, using the embodiment of FIG. 1. The method will be described with reference to FIGS. 1-4. The method 500 can include more or fewer steps or can arrange the order of the steps differently than those shown in FIG. 5. The method starts at step 594 and ends at step 560.

At step 508, the host aircraft receives drone flight plan data such as described with respect to FIG. 3A. The method proceeds to step 512 wherein the host aircraft begins its flight. The method continues to step 516 wherein the airborne monitor/report system is turned on, e.g. by the pilot or crew member or passenger. In some embodiments, the system automatically turns on when the host aircraft is airborne, such as triggered by a weight on wheels sensor or other means known in the art to determine that the aircraft is airborne.

The method 500 continues to step 520 where system parameters may be selected. Selectable parameters comprise sensor suite selection (e.g. visible band still camera only, camera plus video, IR camera, MMW radar, etc), sensor surveillance pattern (e.g. swath width as shown in FIG. 2B, single side sensing only), and recording parameters (e.g. to include mapping recordings as shown in FIGS. 4A-B). In one embodiment, one or more system parameters are automatically selected, e.g. by on-board data management system. In one embodiment, all system parameters are automatically selected. In one embodiment, the sensor scanning is governed and/or influenced by the drone flight plans uploaded or received at step 508. The method continues to step 524 wherein surveillance begins.

At step 528, a query is made if a drone of interest has been identified. If the response is NO, the method continues to step 530 wherein surveillance continues. If the response is YES, system parameters are adjusted at step 532. The adjustment at step 532 allows, among other things, for additional or alternate sensors to be directed at the drone of interest, or for adjustment of sensors already engaged with the drone. For example, if a single visible camera was initially solely engaged as surveillance at step 520, at step 532 an additional camera may be trained on the drone, or sampling rate and/or resolution of one or more sensors may be increased or adjusted. Step 532 may be performed manually by pilot, passenger or crew member, or may be fully or partially automated. The adjustments and selections at steps 520 and/or 532 may be determined or influenced by data provided at step 508. At the completion of step 532, the method 500 continues to step 536 where the surveillance of the drone of interest is recorded. In some embodiments, recording of any operational surveillance sensor is performed whenever the system is operable, that is, e.g. beginning at step 516. The step 536 continues until recording ends at step 540 and the method continues to step 544.

At step 544, a query is made as to whether the recording should be broadcast. If the reply is NO, the method 500 continues to step 556. If the reply is YES, the method continues to step 548. At step 548, a receiving site for the data is selected, in some embodiments manually by pilot, crew member or passenger and in others, in a semi or fully automatic manner. For example, system 100 may be programmed or set to automatically send recordings to the FAA perhaps at a designated FAA recording url. In some embodiments, the system, eg by way of data management system, adjusts the raw recorded data so as to place the recorded data in a designated format and/or protocol requested or required by a particular receiving site, eg the FAA. The data may be prepared to include to data format described with respect to FIG. 3B. The method then continues to step 556.

At step 556, a query is made as to whether the flight is continuing. The query may be answered manually by the pilot, crew member or passenger, or may be semi or fully automatically made, for example by any known means to determine if the aircraft is still airborne. If the response to query 556 is NO, the method 500 continues to step 560 wherein the method 500 ends. If the response to the query is YES, the method 500 continues to step 558 wherein surveillance continues.

In some embodiments, the automatic or semi-automatic control of systems or components, as described above, is implemented by computer hardware, software, or a combination thereof. In one embodiment, the report or documentation of drone activity is broadcast to adjacent aircraft, either as a broad broadcast on through directed communication to identified or registered aircraft. For example, a registry listing of aircraft requesting shared reports of drone activity may be stored in the data management system wherein such parties receive reports of drone activity identified by the system 100. In some embodiments, the report of drone activity is sent to parties comprising air traffic control, law enforcement, emergency medical service, airborne fire fighting, and military. In some embodiments, the drone identified or sensed is a non-cooperative target. In one embodiment, the report broadcast by host aircraft is placed into NASA Aviation Safety Reporting System format and/or protocol, wherein the report is filed directly with NASA. In some embodiments, the documentation of drone activity is sent once the host aircraft is on the ground and/or is stored on the data management system.

What is claimed is:

1. An airborne system to identify and report drone flight operations, the system disposed on an aircraft and comprising:
    a surveillance subsystem identifying a drone operating in an airspace adjacent the aircraft;
    an imaging subsystem acquiring at least one image of the drone;
    a navigational subsystem providing aircraft state data associated with the at least one image of the drone; and
    a communication subsystem transmitting the at least one image of the drone and the associated aircraft state data to a receiving station;
    wherein the at least one image of the drone and the associated aircraft state data are received by the receiving station.

2. The system of claim 1, wherein the receiving station is a ground-based receiving station.

3. The system of claim 1, further comprising a triggering subsystem interconnected with the surveillance subsystem and activating the imaging subsystem.

4. The system of claim 1, wherein the surveillance subsystem surveils a region adjacent a flight path of the aircraft.

5. The system of claim 4, wherein at least one of the surveillance subsystem and the imaging subsystem comprise a radar.

6. The system of claim 1, wherein the imaging subsystem comprises a camera and a camera orientation sensor to measure a camera orientation of the camera.

7. The system of claim 6, wherein a camera orientation associated with the at least one image of the drone is measured and transmitted by the communication subsystem to the receiving station.

8. The system of claim 6, further comprising a database configured to store drone flight plans, wherein the camera orientation is determined by the drone flight plans.

9. The system of claim 8, wherein the camera is oriented to track an intended flight path of at least one drone.

10. An airborne system to identify an airborne drone in a particular airspace, the airborne system coupled with a first aircraft, the system comprising:
    an imaging component imaging the airborne drone operating in the particular airspace, the imaging component producing images;
    a navigational component providing state data of the first aircraft, the state data of the first aircraft associated with the images; and
    a communication component transmitting the state data of the first aircraft and the images to at least one of a ground-based receiving station and a second aircraft.

11. The system of claim 10, further comprising a surveillance component identifying the airborne drone operating in the particular airspace.

12. The system of claim 10, wherein the state data of the first aircraft and the images are transmitted to the ground-based receiving station.

13. The system of claim 12, further comprising a surveillance component identifying the airborne drone operating in the particular airspace.

14. The system of claim 10, wherein:
    the state data of the first aircraft and the images determine a location of the airborne drone; and
    the location of the airborne drone is transmitted to the second aircraft.

15. The system of claim 10, wherein:
    the communication component transmits the state data of the first aircraft and the images to the ground-based receiving station; and
    the ground-based receiving station transmits a drone activity report to the second aircraft, the drone activity report associated with the state data of the first aircraft and the images.

16. The system of claim 10, wherein:
    the imaging component is a radar; and
    the radar provides range and angle to the airborne drone relative to the first aircraft.

17. The system of claim 10, wherein:
    a location of the airborne drone is displayed on a display disposed in a cockpit of the first aircraft.

18. An airborne system receiving a drone activity report, the airborne system comprising:
    a communication component receiving the drone activity report;
    a display providing a location of at least one drone associated with the drone activity report; wherein:
    the drone activity report is associated with a first aircraft, the first aircraft imaging the at least one drone to produce images and broadcasting the images to a ground-based receiving station;
    the airborne system is disposed on a second aircraft;
    the ground-based receiving station creates the drone activity report, the drone activity report associated with the images'of the at least one drone; and
    the drone activity report is broadcast to the second aircraft by the ground-based receiving station.

19. The airborne system of claim 18, further comprising a cockpit display, wherein:
    the display provides a location of the at least one drone based at least in part on the images.

20. The airborne system of claim 19, wherein:
    the images are produced by a radar; and
    the drone activity report comprises data associated with at least one filed drone flight plan.

* * * * *